(12) United States Patent
Golas et al.

(10) Patent No.: US 7,885,330 B2
(45) Date of Patent: Feb. 8, 2011

(54) METHODS, PROGRAM PRODUCTS AND SYSTEMS FOR COMPRESSING STREAMING VIDEO DATA

(75) Inventors: Christopher E. Golas, Hampton Falls, NH (US); Jon N. Swanson, Queensbury, NY (US)

(73) Assignee: Insors Integrated Communications, Chicago, IL (US)

( * ) Notice: Subject to any disclaimer, the term of this patent is extended or adjusted under 35 U.S.C. 154(b) by 1525 days.

(21) Appl. No.: 11/221,288

(22) Filed: Sep. 7, 2005

(65) Prior Publication Data

US 2007/0014363 A1   Jan. 18, 2007

Related U.S. Application Data

(60) Provisional application No. 60/698,349, filed on Jul. 12, 2005.

(51) Int. Cl.
*H04N 7/12* (2006.01)
(52) U.S. Cl. .............. 375/240.16; 348/14.1; 370/261; 370/493
(58) Field of Classification Search .......... 370/267, 370/204, 263, 265, 269, 356, 351; 375/240.16, 375/240.26; 348/14.01, 14.02, 14.03, 14
See application file for complete search history.

(56) References Cited

U.S. PATENT DOCUMENTS

| | | | |
|---|---|---|---|
| 5,805,228 A | 9/1998 | Proctor et al. ............... 348/422 |
| 5,831,678 A | 11/1998 | Proctor ....................... 348/422 |
| 5,864,681 A | 1/1999 | Proctor et al. ............... 395/200 |
| 5,909,250 A * | 6/1999 | Hardiman ............... 375/240.03 |
| 5,926,226 A | 7/1999 | Proctor et al. ............... 348/422 |
| 5,999,525 A | 12/1999 | Krishnaswamy et al. .... 370/352 |
| 6,072,830 A | 6/2000 | Proctor et al. ............... 375/240 |
| 6,680,745 B2 | 1/2004 | Center, Jr. et al. ........ 348/14.16 |
| 6,775,247 B1 | 8/2004 | Shaffer et al. ............... 370/260 |
| 7,142,251 B2 * | 11/2006 | Sha et al. ..................... 348/557 |
| 7,151,762 B1 | 12/2006 | Ho et al. |
| 7,193,996 B2 | 3/2007 | Dobbins et al. |
| 7,225,459 B2 | 5/2007 | Magliaro |
| 7,385,940 B1 * | 6/2008 | Harrow et al. ............... 370/267 |
| 2004/0111472 A1 | 6/2004 | Swanson et al. |
| 2004/0117446 A1 | 6/2004 | Swanson |
| 2004/0236593 A1 | 11/2004 | Swanson et al. |
| 2004/0249967 A1 | 12/2004 | Swanson |
| 2005/0094455 A1 * | 5/2005 | Wu ............................ 365/208 |
| 2005/0232151 A1 | 10/2005 | Chapweske et al. |

(Continued)

OTHER PUBLICATIONS

Chris Foley, "Dynamic Bandwidth Throttling," A Technical White Paper, XcelleNet, Inc. believed published on the worldwide web Oct. 2002.

(Continued)

*Primary Examiner*—Seema S Rao
*Assistant Examiner*—Henry Baron
(74) *Attorney, Agent, or Firm*—Greer, Burns & Crain, Ltd.

(57) ABSTRACT

A method for selecting a compression setting to use during a communications session to compress streaming video data includes the steps of determining processor performance data for at least one processor, determining a video data acquisition rate, and using the processor performance data and the acquisition rate to identify a compression setting for the data communications session.

18 Claims, 5 Drawing Sheets

U.S. PATENT DOCUMENTS

2005/0237377 A1    10/2005   Chapweske et al.
2008/0170616 A1*   7/2008    Hwang et al. .......... 375/240.16

OTHER PUBLICATIONS

Microsoft Corporation, "How Bandwidth Throttling Works in IIS 4.0," published on the world wide web circa 2003.

Microsoft Corporation, Chapter 7: Network Bandwidth Considerations, published on the world wide web circa Dec. 1999.

Andy Volk, "Video Compression: A codec Primer," published on the worldwide web http://webmonkey.wired.com/webmonkey/04/42/index4a.html.

Wave Report "Video Compression Tutorial" http://www.wave-report.com/tutorials/VC.htm.

Berkeley Design Technology, Inc. "Smart Processor Picks for Consumer Media Applications, Introduction to Video Compression" Embedded Systems Conference, 2004, p. 1-22.

* cited by examiner

| Table of Compression Settings (KCycles / macroblock) Required to Perform Compression: | | | | | | |
|---|---|---|---|---|---|---|
| | | | (KCycles / macroblock) Required to Perform Motion Detection in Search Area of: | | | |
| Compression Settings → | | DCT only: | 1 Pixel search | 2 Pixel search | 4 Pixel search | 8 Pixel search |
| Processor Name and Speed: | | | | | | |
| Family: | Speed: | | | | | |
| Pentium | | | | | | |
| | 1 GHz | 12 | 30 | 118 | 345 | 600 |
| | 1.3 GHz | 10 | 26 | 82 | 267 | 450 |
| | 1.67 GHz | 8 | 24 | 76 | 240 | 425 |
| | 2 GHz | 6 | 19 | 64 | 212 | 380 |
| | 2.2 GHz | 5 | 15 | 49 | 157 | 290 |
| | 2.8 GHz | 3 | 9 | 40 | 126 | 205 |
| | 3 GHz | 2 | 4 | 13 | 42 | 80 |
| | 3.5 GHz | 1 | 2 | 7 | 23 | 45 |
| | | | | | | |
| Centrino | | | | | | |
| | 1 GHz | 15 | 48 | 151 | 427 | 705 |
| | 1.2 GHz | 13 | 36 | 143 | 387 | 680 |
| | 1.67 GHz | 10 | 29 | 124 | 321 | 600 |
| | 2.1 GHz | 7 | 24 | 78 | 227 | 430 |
| | 3 GHz | 3 | 9 | 32 | 98 | 190 |
| Athlon | | | | | | |
| | 1 GHz | 12 | 38 | 134 | 390 | 745 |
| | 1.3 GHz | 11 | 34 | 112 | 334 | 620 |
| | 1.67 GHz | 8 | 26 | 82 | 250 | 478 |
| | 2 GHz | 6 | 19 | 67 | 210 | 390 |
| | 2.2 GHz | 6 | 17 | 58 | 146 | 275 |
| | 2.8 GHz | 3 | 11 | 34 | 89 | 160 |
| | 3 GHz | 2 | 5 | 11 | 45 | 85 |

METHODS, PROGRAM PRODUCTS AND SYSTEMS FOR COMPRESSING STREAMING VIDEO DATA

CROSS REFERENCE

The present application claims priority on U.S. Provisional Application No. 60/698,349 filed on Jul. 12, 2005.

FIELD OF THE INVENTION

The present invention is related to systems, methods and program products for compressing streaming video data, including streaming video data being communicated during a communications session over a data network. The present invention is related to systems, methods and program products for compressing streaming data, including streaming video data being communicated during a communications session over a data network.

BACKGROUND

Communication over data networks has become commonplace. Examples of such communications include the use of packet-based digital data to communicate audio and video data in real-time over a data network. Voice and video data sharing, for example, can occur in real time over a data network between two or more users during a streaming videoconference or other virtual meeting.

Required bandwidth to transport the data can be considerable. Taking video conferencing as one example application, multiple participants may be streaming voice, video, and application data with each of the other participants in real time. Each participant may receive all data streams from all other participants. Each participant may be connected to the conference by a network connection that has a different bandwidth capacity from all other connections. Further, other data traffic is often being carried over the network connections that may be unrelated to the videoconference.

To reduce the amount of bandwidth required, compression of data prior to communication may be performed. Software and/or hardware components that perform these steps may be referred to as "coders" and/or "decoders," and are more commonly known as "codecs." Codecs may perform other tasks in addition to data compression. Depending on the particular steps that a codec performs, the amount of data to be processed, and other factors, codecs may consume significant processor resources. In the particular case of a video codec, for instance, the demands that a codec places on a processor varies with the size and transmission rate of images. Large images that are communicated at a high frequency require more extensive use of a codec than smaller images communicated at a lower frequency.

Some steps of data compression performed by codecs are known. Depending on the particular type of data, different compression steps may occur of varying computational complexity. Because video data can be quite voluminous, various schemes of compression have been developed unique to video data. Both temporal and spatial compression may be performed. One example compression scheme is discrete cosign transformation (DCT) compression. Another is referred to as motion detection, or motion vector analysis. Generally, motion detection operates to determine which portion of a video image has changed from a previous image (i.e., what has "moved"). Only the portion of the image that has changed is then communicated, as opposed to the entire image. For example, if a person is speaking in front of a camera, the image from frame to frame may include an unchanging background, with only the speaker's face showing differences. In this case only the pixels of the image that make up the face may be compressed and communicated, with the background remaining constant from frame to frame.

Motion detection may be practiced in many different particular steps. Some codecs perform a detailed comparison of frames to determine change (e.g., a codec may "subtract" a second frame from a first to identify differences). Others perform other steps of analysis that may include additional opportunities for data savings. Use of motion vectors, for example, can further reduce the amount of data required to be communicated. In addition to searching an image only for changed portions (i.e., movement), motion vector analysis further attempts to identify a portion of the image that has changed, motion analysis steps may include identifying only the portion of a previous frame that has moved and simply code instructions to duplicate that portion in a new position in a subsequent frame. This may be accomplished, for instance, by calculating motion vectors that describe the movement.

For example, if a speaker is sweeping his arm across the screen as he speaks, a codec performing motion vector analysis may identify that the speaker's arm is shifting from frame to frame and determine the frame by frame shift. Rather than sending updated portions of the image data that include the arm in its new position, the codec will identify the portion of the previous frame that includes the arm and specify motion vectors that describe the direction and distance to shift the arm in the a sequential frame.

Compression steps such as motion vector analysis can be computationally intensive. A search and comparison of frames must be done to identify shifted portions. Further calculations must then be made to derive motion vectors that describe the direction and amount of shift. Generally, motion vector analysis is performed in 1, 2, 4, 8, 16, etc. pixel search areas. The larger the search area, the more computations are required.

These and other steps of video data compression can place extreme demands on processors. Potentially, the processor can reach maximum utilization and cause application failure. Further, even if a maximum level of processor utilization is not reached, excessive video compression calculations can cause a processor to neglect other applications unrelated to the codec that are simultaneously being run. These problems are troublesome for videoconference codecs that may be used by a variety of different machines that utilize different processors and different secondary applications running thereon. In a videoconference with multiple attendees, for example, some participants may be using personal computers with relatively slow processors that must support numerous other simultaneous services and applications, while other participants may have dedicated servers with much more powerful processors. Some of the processors may be able to support intensive video compression analysis, while others of the machines can support only minimal compression.

SUMMARY

A method for specifying a compression setting for compressing streaming video data communicated from a computer having at least one processor during a communications session includes the steps of determining processor performance data for the at least one processor, determining a video data acquisition rate, and using the processor performance data and the data acquisition rate to identify a compression setting for the communications session.

DETAILED DESCRIPTION

Before discussing exemplary embodiments of the present invention in detail, it will be appreciated that the invention may be embodied in a method, a system, and/or in a computer program product. For example, a method of the invention may be carried out by one or more users using computers, and a program product of the invention may include computer executable instructions that when executed by one or more computers cause one or more computers to carry out a method of the invention. Further, one or more computer(s) in combination with connected hardware such as one or more of cameras, microphones, monitors, projectors, and the like that are carrying out steps of a method of the invention and/or that are running a program product of the invention may define a system of the invention. It will therefore be understood that in describing a particular embodiment of the present invention, description of other embodiments may also be made. For example, it will be understood that when describing a method of the invention, a system and/or a program product of the invention may likewise be described.

Figure 1:
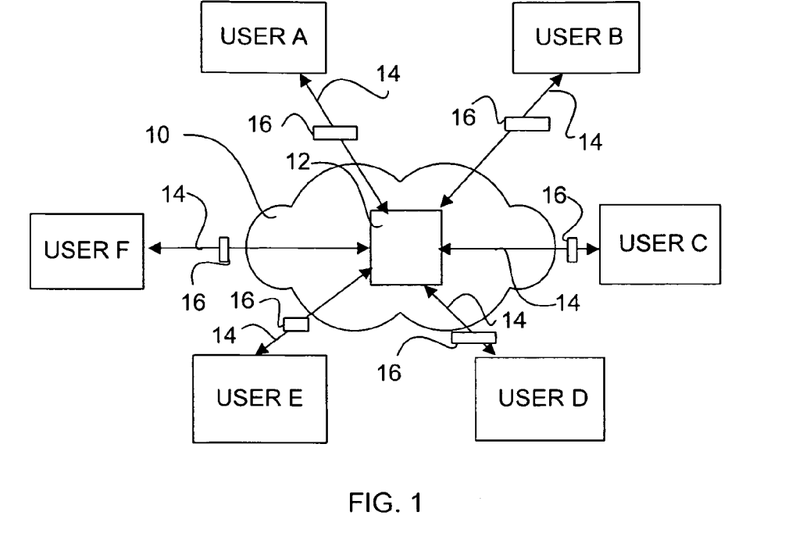
FIG. 1 is a schematic of a network useful for illustrating methods and program products of the invention in a videoconference environment.

Turning now to the drawings, FIG. 1 is a schematic of a network that is useful to describe an exemplary method of the invention. The network shown as a "cloud" 10 includes an interface 12 that links Users A-F to one another. The term "interface" as used herein is intended to be broadly interpreted as comprising one or more components for linking communications between users. It may include, for example, one or more computers having a plurality of communication ports, a software component running on one or more computers that facilitate communications, a networking card(s), a modem(s), and the like. The interface 12 may be referred to in the video/audio conferencing and networking arts as a "bridge" or server which generally comprises a computer or router having a plurality of ports for interconnecting the Users A-F. As used herein the term port is intended to be broadly interpreted as a physical or logical destination and/or origination point for digital communications. Examples of ports include but are not limited to, network cards, an IP address, a TCP or UDP port number, and the like.

The network 10 may be a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may be the internet. Also, the protocol between the bridge 12 and the Users A-F may be that of a server and clients.

The network 10 may be useful for a number of data communication purposes. In an exemplary application, the network 10 is useful to facilitate a video communications session between one or more of the Users A-F. Examples of a video communications session include a videoconference wherein two or more of the Users A-F share streaming video and/or audio communications in real-time. As used herein the term "real-time" is intended to broadly refer to a condition of generally corresponding to actual time. For example, data is real-time if it takes about one minute of data playback to describe an event that took about one minute to occur. Real-time data may be, but is not necessarily, "live" data that is generated and communicated substantially contemporaneously. In a videoconference, for example, multiple participants may be sending and receiving live real-time video and audio data to one another—each is talking to one or more of the others in real-time.

Communications with each of the Users A-F may be carried out on a 2-way basis from the network 10, with data sent to and received from each of the Users A-F over the communications lines 14. These may comprise physically wired connections such as copper wires, optical fiber cables, or the like; or may be wireless connections. Real-time video, audio, and other data may be sent from each of the Users A-F to all others of the Users A-F through the bridge 12 and over the communications lines 14. A firewall 16 or other security device may isolate the Users A-F from the network 10.

Those knowledgeable in the art will appreciate that communications over the network 10 between the Users A-F may be carried out in any of a number of generally known procedures. For example, known methods of one or more of uni-, multi-, or broad-cast may be used. Also, the data may be streaming. In a streaming video communications session application, each user A-F may have one or more cameras, telephones and/or microphones from each of which is streamed a continuous, real-time data stream on a particular multicast address and port number. As used herein the term continuous data stream is intended to broadly refer to a data stream sent in substantially continuous succession, although some degree of intermittency is contemplated. For example, a packetized data stream in IP may be continuous and streaming even though there may be some delay between discrete packets.

Figure 2:
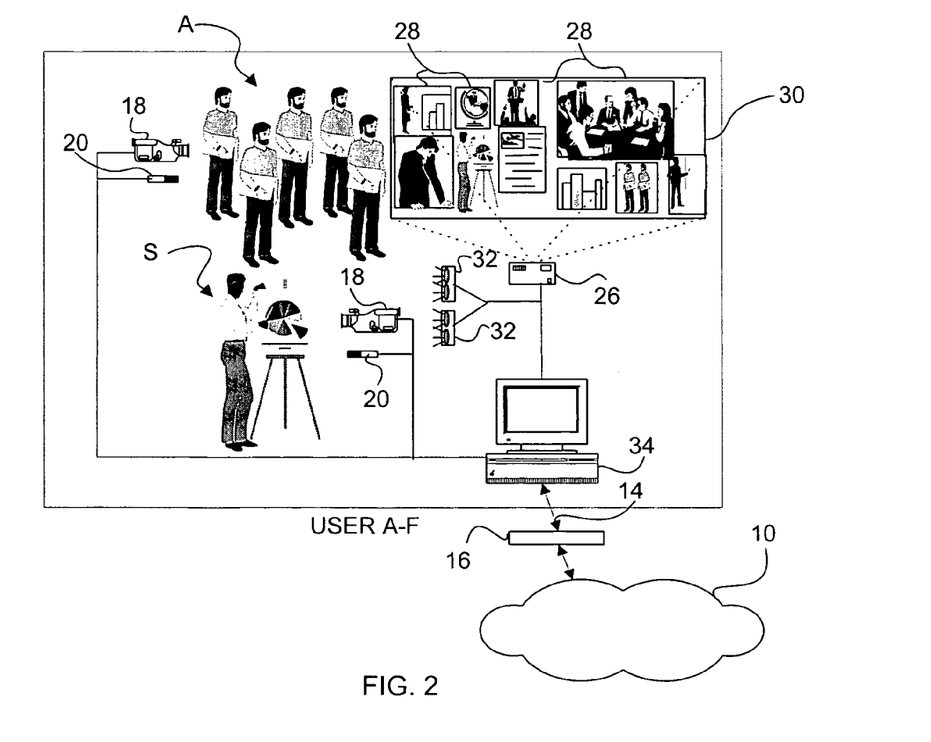
FIG. 2 is a schematic of a user of the network of FIG. 1.
Figure 3:
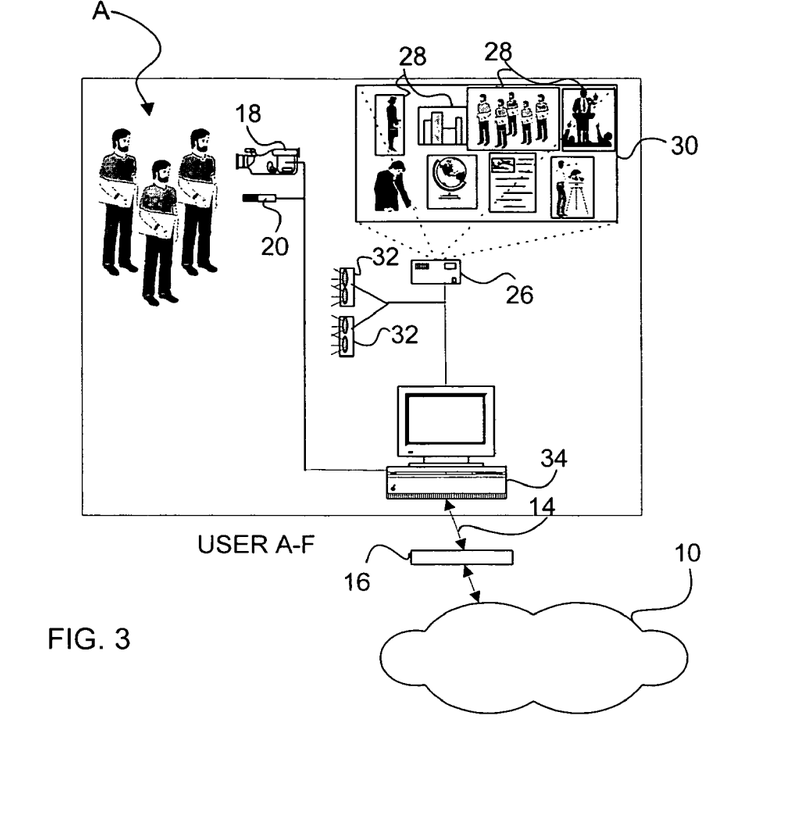
FIG. 3 is a schematic of an alternate user of the network of FIG. 1.
Figure 4:
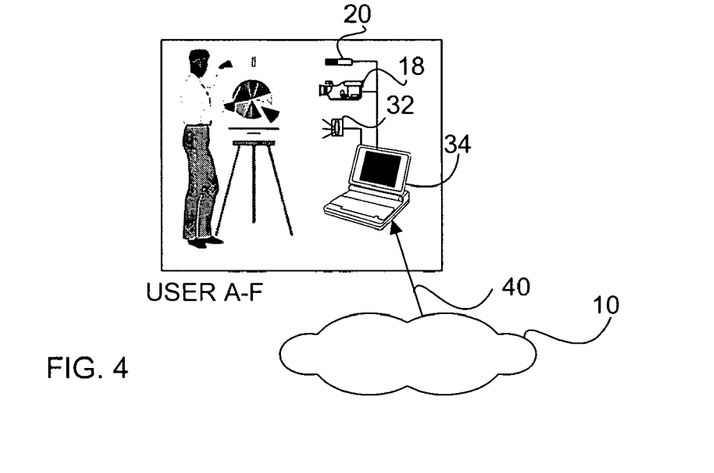
FIG. 4 is a schematic of an alternate user of the network of FIG. 1.

Communications of the streaming real-time data between Users A-F may be further appreciated through consideration of FIGS. 2-4 that schematically show some example configurations of the Users A-F. As shown by FIGS. 2-3, the Users A-F may be conference rooms, class rooms, or other spaces in which multiple individuals gather to participate in the video communications session with other individuals that are located at others of the Users A-F. FIG. 4 illustrates an alternate configuration in which a single individual is participating in the conference from, for example, a home office, a hotel room, or other location. Each of the Users A-F can use one or more cameras 18 that are directed at an audience A, an instructor S, or other things or people. In FIG. 3, only an audience A is present. Many different cameras will be appropriate for practice of the invention, with suitable examples including those available from LOGITECH Co., Fremont Calif. (e.g., Logitech QuickCam Pro 4000), the SONY EVI D100 series and/or the CANON VC series of remote pan/tilt cameras, and the like. With reference to FIG. 2, the cameras 18 at one User A-F may be trained on different people or things at that location, with an example being one camera 18 at an audience A and one camera 18 at an instructor or speaker S. The cameras may be controllable remotely, so that User A may be able to direct the direction of a camera 18 at User B, for instance. At other locations, with examples shown in FIGS. 3-4, only one camera 18 is present.

In FIG. 2, two microphones 20 are provided—one for receiving audio from the instructor S and a second for receiving audio from the audience A. There are a wide variety of suitable microphones available, including by way of example SONY ECM microphones, POLYCOM microphones, and the like. Although not illustrated, those knowledgeable in the art will appreciate that other cameras, microphones, computers, gateways, firewalls, mixers, multi-plexers, and like devices may also be present depending on desired video communications session details and other factors.

With reference to FIG. 4, only a single camera 18 is provide and a single microphone 20 along with a laptop computer 34. This might be useful for allowing an individual to participate in a video communications session from a home office, while traveling in a hotel room or plane, or the like. The camera 18 (such as a LOGITECH QuickCam) and microphone 20 might be combined on a laptop mountable unit, for instance, and the speaker 32 (and an alternate microphone 20) might be headphones worn by the user. Suitable headphones include those available from PLANTRONICS Corp. This example configuration is particularly convenient for portable participation in video communications sessions.

In an exemplary video communications session such as a videoconference, each of the Users A-F not only sends streaming video and audio data, but likewise receives streaming video, audio, and other data communicated from some or all of the other Users A-F. Referring once again to the schematics of FIG. 2-3 by way of example, one or more projectors 26 may be provided to project real-time video images 28 from one or more of the other Users A-F on a screen 30. There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being having at least 2000 lumens and XGA resolution. Also, it will be appreciated that use of a projector to display output images may easily be replaced with use of a monitor on which output video images are viewed. For example, FIG. 4 illustrates a laptop computer 34 the monitor of which may be useful to display output video data streams 28 from others of the Users A-F. One or more speakers 32 may also be provided to play real-time audio from the other users or other sources.

Any number of video images may be provided that show video data in real-time from any number of other cameras or other sources located at the other users. For example, the user A may simultaneously display output video data streams 28 from each of the other users B-F, or may choose to display on a select subset of those streams. The display of streams may be set as desired, with different output display streams 28 located in different location on the display 30. Further, the output video streams 28 may include charts, graphs, documents, other digital files, replayed video files, and the like. Digital documents such as charts, word processor documents, spreadsheets and the like may be input to any of the computers 34 at any of the Users A-F for display at all or some of the other Users' locations. Likewise, digital images, including stored video streams and digital documents, for instance, may be stored in a memory accessible over the network 10 for replaying during the video communications session at any or all of the Users A-F.

A particular example of a data file in addition to audio and video data includes shared documents having text, images, numerical values, and the like. For example, within a video-conference or virtual meeting different of the Users A-F at different locations may desire to all work on a single document. In such circumstances, continuous updates of the document should be communicated between Users, with a real-time image of the document displayed.

The one or more computers 34 at each of the Users A-F may be used to receive and send all of the video, audio, documents, digital files and other data at the standard user A. The computer 34 may be referred to as a client computer or client. A variety of computers that are commercially available will be suitable for use as computer 34, with examples including the Dell Precision 470 with dual processor and the HP Workstation XW6000 dual processor. In some applications a portable computer such as a laptop, cellular phone, PDA or other computer may be useful.

An application program, including one or more codecs, may be running on the computer 34 to provide signal coding/decoding, compression/decompression, to coordinate receiving and sending of the data streams, and to control other aspects of sending and receiving of the data streams. For example, the computer 34 may be used to control which or how many video images 28 are displayed on the screen 30, to size the images 28, to set audio levels for the speakers 32, and the like. Each computer 34 may be running a video codec, an audio codec and other codecs. These may be combined into a single application program or may be separate from one another. It will be appreciated that many alternatives to the computer 34 are possible, including dedicated processor based devices and the like. The computer may also have video and audio capture cards, with an example being WEBCAM Corp. 4 input video capture card.

According to the configurations of FIGS. 1-4, a real-time video communications session such as a videoconference or other virtual meeting can occur between two or more of the Users A-F. The Users A-F may virtually "attend" a rich, immersive, and extensive virtual meeting that includes audio, video and/or other streaming data shared in real-time. Participants at each of the Users A-F may simultaneously hear and/or view data from all others of the Users A-F. Such meetings may be desirable for corporations, universities, government, and other groups of people located remotely from one another that find it useful to interact in an environment that allows a greater level of intimacy than an audio-only phone call or a single image video conference.

Applications include for use of video communications sessions of the present invention include, but are not limited to, distance learning, medical consultation, industry collaboration, social interaction, government or university collaborative research, and the like. In a distance learning application, a professor at one site may be able to take questions from students located and many additional sites. Each of the sites can view all of the other sites, and can hear a question from any other site (and see the questioner). In a medical consultation application, doctor specialists from around the country can participate in the diagnosis of a particular case. X-rays can be viewed by all, and each doctor at each location can discuss the case with all of the other participating doctors. In an industrial collaboration application, remotely located engineering, marketing, management, and labor teams may all discuss development of a new product. Each site may ask questions of any other site, and each site may submit documents and charts covering aspects of the project that they are responsible for.

In video conferences and other video communications sessions such as these, the required bandwidth to communicate the multiple data streams between the Users A-F (FIG. 1) can be extensive. It is desirable to reduce the required bandwidth.

One means for doing so is through compression of video data coming from the cameras 18 at the computers 34 or elsewhere on the network 10. Compression may be performed by codecs and/or other applications at any of the computers 34, the server 12, or at another computer connected to the network 10. Generally, compression is performed at a computer 34 from which the video data originates. Video data compression may include traditional steps of data compression, with an example being DCT compression, in addition to more sophisticated steps such as motion detection and motion vector analysis. While these compression steps may provide significant savings in the amount of bandwidth required to communicate the video data, the savings are only achieved at the cost of increased computational demand on the processor(s) performing the compression. In some cases, the demands on the processors in the computers 34, for instance, may be so great as to interfere with the operation of other applications, or in severe circumstances to cause one or more applications to fail. Methods, program products, and systems of the invention are directed to reducing these undesirable results.

Figure 5:
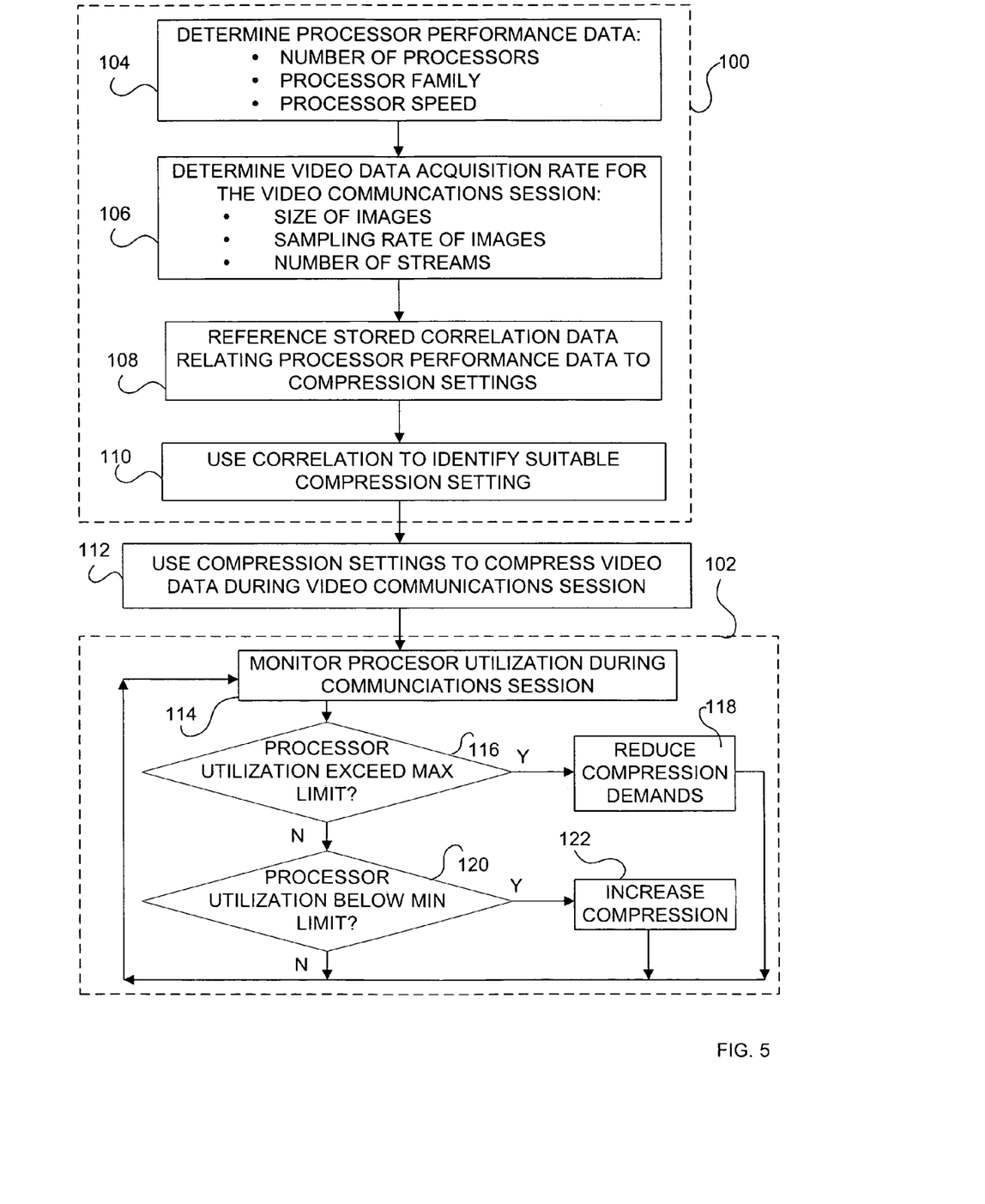
FIG. 5 is a flowchart illustrating one example method of the invention.

FIG. 5 is a flowchart illustrating one exemplary method of compressing video data of the invention. This method may be performed, for example, in the form of a computer program product by any of the computers 34 (FIGS. 2-4) during a video communications session such as a videoconference between two or more of the Users A-F. The method of FIG. 5 is divided into a "static" portion 100 and a "dynamic" portion 102. The terms "static" and "dynamic" are used herein in this context for convenience only, are intended to be broadly interpreted, and are not intended to have any particular special meaning. The "dynamic" steps of the invention can be performed repeatedly or even continuously during a communications session while it is in progress, while the "static" steps of blocks 104-100 are typically performed only at the initiation of a communications session and/or when a new user or video stream is added to the session.

Within the static portion 100, an initial step of determining processor performance data is performed. (block 104) As used herein, the term "processor performance data" is intended to be broadly interpreted as information relating to the ability of a processor to process data. The processor performance data may comprise, for example, some or all of the processor family, speed, and number of processors. As used herein, the term "processor family" is intended to be broadly interpreted as the architecture of the processor. Those knowledgeable in the art will appreciate that a processor family may be identified by a tradename such as PENTIUM (a registered trademark of Intel Corp., CA), DOTHAN (a trademark of Intel Corp.), CENTRINO (a registered trademark of Intel Corp.), ATHLON (a registered trademark of Advanced Micro Devices Corp., CA), as well as a model number, with an example being a PENTIUM 4, PENTIUM M, INTEL 80486 processor, ATHLON 64, ATHLON XP, and the like. The family of processor can also specify the circuitry architecture that the processor has, which in turn affects the speed at which it performs computations.

Processor performance data can also include processor speed. Those knowledgeable in the art will appreciate that processor speed refers to the cycles per second that the processor is capable of performing. Each cycle of the processor includes executions of calculations. Accordingly, a processor's speed is proportional to the speed at which it can process calculations. In some cases, a processor tradename may indicate speed (e.g., a PENTIUM 4 may be known to have a speed of 4 Ghz). In other cases, a speed may be specified separately from the family (e.g., a PENTIUM 2.66 GHz processor or a PENTIUM 2 GHz processor). Some machines such as a computer 34 (FIGS. 2-3) may feature more than one processor. The step of block 104 can also include determining the number of processors present. If more than one is present, the family, speed and other performance data for each are determined.

Other processor performance data may also be determined. The presence of any useful devices or functionalities that may aid in video compression may be determined. Examples include available random access memory (RAM) (including dynamic and other forms of random access memory (e.g., DRAM)), particular video processing capabilities, and the like.

The present invention contemplates a number of suitable steps for making the determinations of block 104. One example step that has proven useful when practicing the present invention in the form of a computer program product includes use of software function calls. Intel Performance Primitives ("IPP") are one example set of useful function calls that are available from INTEL. Such function calls can be utilized as a stand-alone set of program instructions or within a larger set of program instructions to query a computer for processor performance data obtained in step 104. The result of such a query may include, for instance, the processor family, speed, available memory, type of memory, presence of any additional resources useful for video data processing, etc. . . . For example, a query response might include the information: processor: AMD ATHLON, speed: 2.3 GHz, memory: 256 MB DRAM, 256 MB SRAM.

The example method of the invention of FIG. 5 also determines the video data acquisition rate that is desired during a video communications session. (block 106). As used herein, the term "video data acquisition rate" is intended to be broadly interpreted as referring to the amount of video data that is expected to be acquired per unit time during the communications session. Put another way, the video data acquisition rate expected during the communications session represents the amount of video data that will be subject to compression.

The video data acquisition rate can be determined through knowledge of the size of images (e.g., image resolution) to be communicated during the session and the number of images to be communicated during the session. This data may be determined by knowing the image size, number of video streams, and scan rate. For example, assume a User A-F (FIG. 1-2) has two cameras that will each be communicating a video stream during the communications session of images that are 352×288 pixels in size at a scan rate of 30 images per second, then the video data acquisition rate expected during the communications session can be calculated as:

(2 streams)×(352×288 pixel/image)×(30 images/sec)
=6.1 megapixels/sec

For convenience it may be desirable to units of pixels may be converted to standard two dimensional pixel area sizes such as macroblocks (block of 16×16 pixels), CIF (block of 352× 288 pixels), QCIF (quarter CIF), and the like.

The frame rate or scan rate in many streaming video applications typically varies between about 60 frames per second to 10 frames per second. Film motion pictures generally have a scan rate of 60 frames per second. The VGA standard is 30 frames per second. Viewers typically can detect "choppiness" in images if the frame rate falls below 20, 15, or 10 frames per second. For this reason, it may be preferred to maintain a scan rate of greater than about 20 or greater than about 25 frames per second. Much of industry has adopted 30 frames per second as a standard, with the result that this rate may also be preferred. Note that herein the terms "frame" and "image" are used interchangeably in the context of image scan rate.

With knowledge of the processor performance data, stored data that relates the performance data to compression settings may be retrieved. (FIG. 5, block 108) This stored data may be in the form of a correlation table stored in a memory accessible over the network 10 (FIG. 1). The example table generally correlates processor performance data to required processor power to compress data using a variety of different settings and using a variety of different processors. As used herein, the term "compression settings" is intended to be broadly interpreted as meaning variables useful to control the degree of data. Compression settings may be thought of as specifying what degree of compression will be set. A compression setting may specify which of several different CODECs to use to achieve different compression. A compression setting may also specify, for example, whether a first type of compression (e.g., temporal or DCT) or a second type of compression (spatial or motion vector analysis) is used. A compression setting can also include a compression parameter such as the search area used within motion vector analysis compression. A compression setting can include, for example, an 8 pixel search area in motion vector analysis.

Figure 6:
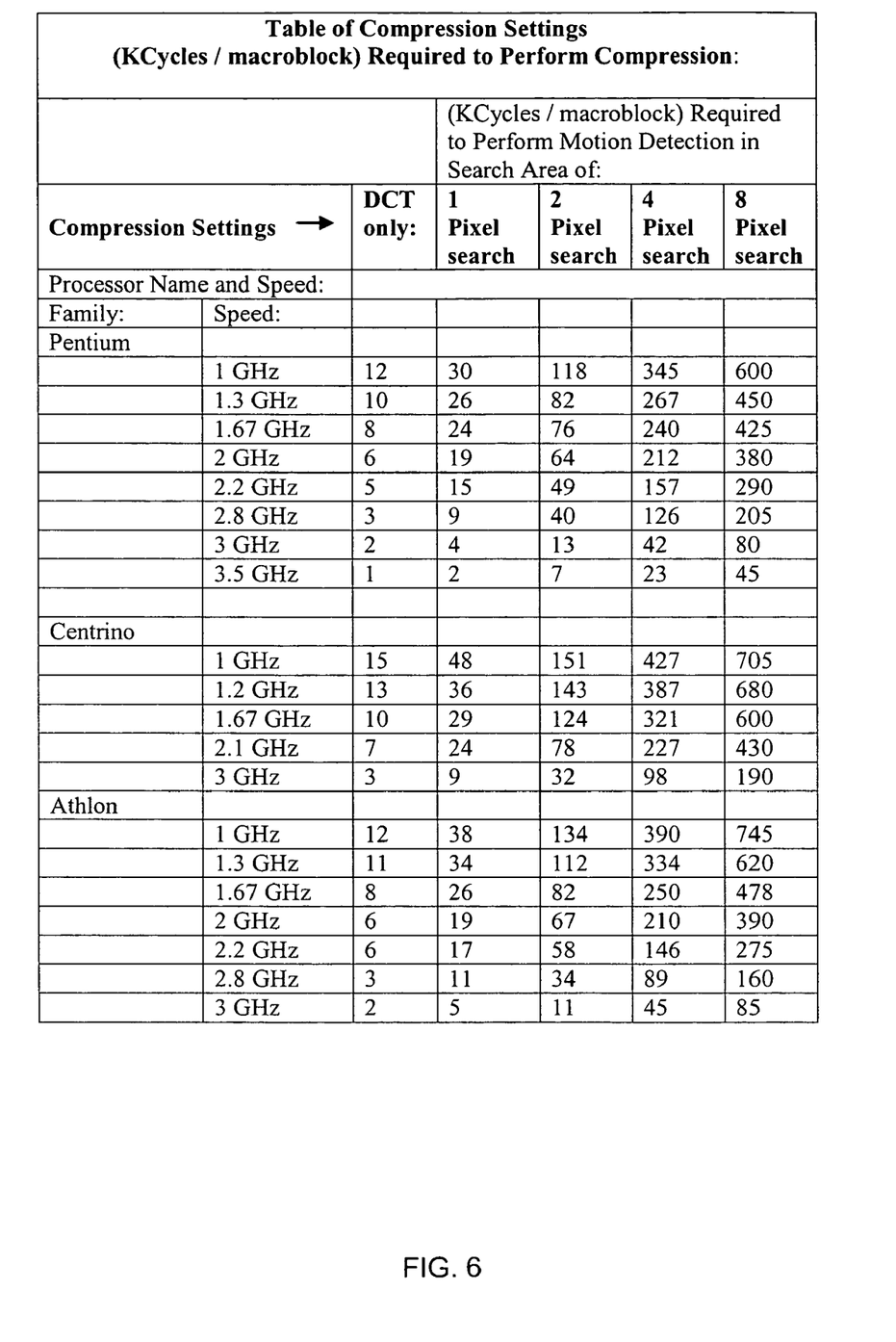
FIG. 6 is an exemplary table illustrating processor performance data.

The table shown in FIG. 6 illustrates one exemplary correlation, and lists hypothetical compression settings. Compression settings are listed across the third row, and include "DCT only" and pixel search areas for performing motion vector analysis over. Other compression settings may also be listed. The data listed in the Compression Settings Table of FIG. 6 is in units of "KCycles/macroblock" for convenience, which may also be thought of as time-based required processor "power" or "resources." Other units may be used, with one example being units of time. The table of FIG. 6 correlates processor performance data (e.g., processor family and speed) to various compression settings (e.g., 8 pixel search in motion vector analysis), in terms of KCycles/macroblock required to perform compression using the particular compression setting with the particular processor. For example, the table indicates that it requires 12 KCycles/mb to perform DCT compression when operating with a Pentium 1 GHz processor. That is, the table reports that it takes 12,000 cycles of a Pentium 1 GHz processor to compress 1 macroblock of data using DCT compression. If this value were expressed in units of time, the value reported would be the time required for one macroblock of data to be compressed using DCT compression and a Pentium 1 GHz machine.

When performing video data compression, demands on the processor increase as the amount of compression increases. This is reflected in the data of FIG. 6 (note that this data is hypothetical and representative only—this data was not empirically determined or calculationally determined). Progressing from left to right across the Pentium 1 GHz row, for instance, it is clear that more processor resources are consumed to perform motion vector analysis compression than are required to perform DCT compression only. Also, as the search area increases within motion vector analysis, the consumed processor resources likewise increase. The table of FIG. 6 also shows that when compressing data using any one compression setting, less processor resources are required as the processor speed increases (e.g., KCycles per macroblock decrease going down any row).

Methods and program products of the invention may also include steps of determining a correlation between compression settings and processor performance data. A method of the invention, for example, may include determining the table of FIG. 6. These steps of determination can include empirical determination (e.g., experimentation) and/or calculation. For example, experiments may be run to determine how long a particular processor takes to compress video data of a given size using particular compression settings. Example steps of doing so include compressing a 10 macroblock sample using each of the compression settings and each of the different processors listed in FIG. 6. The time required to compress the sample is measured and divided by 10 to result in the time per macroblock required. With knowledge of the clock speed of the processor, the number of processor cycles that occurred in that time is determined to result in the reported data in units of KCycles per macroblock. Experiments may be repeated to determine reliable averages.

The correlation data may likewise be determined through calculation, extrapolation and like methods. For example, it is possible to estimate processing time for a given processor through calculation. Compression code can be examined and execution times calculated for each subroutine. Determining how often each routine is run may also be useful. This can be cumbersome, however, and empirical determination of correlations is often preferred. This type of analysis on sections of code may prove practical in some applications, however.

Some or all of the compression setting data can also be determined through extrapolation. Generally, steps of extrapolation include estimating unknown data points using known data points that are related to the unknown points. For example, if the compression time is known for a particular processor at several but not all speeds, times at additional speeds may be estimated using extrapolation techniques based on the known data points. There may be, for example, a linear or other predictable relation between the data. Similarly, if times are known for a given processor at some but not all search areas, times for additional search areas can be estimated using the known data points. Likewise, required times for a second processor can be estimated using known times for a different processor with some knowledge of the relative speed of the two processors.

With knowledge of the processor performance data and the video data acquisition rate, the correlation table of FIG. 6 may be used to select video data compression settings. (block 110) This can be further illustrated through the following example. Assume that the processor performance data determined in step 104 indicated that the processor and family were of a PENTIUM running at 2 GHz. Assume that images of 352× 288 will be generated during the communications session in a single stream (e.g., one camera), and that a scan rate of 20 images per second is desired. The video data acquisition rate is then determined as:

Image size: 352×288 (CIF) image; or 352/16×288/16=396 macroblocks

Scan or transmission rate: 20 images per second.

Video data acquisition rate: (396 mb/image)×(20 images/sec)=7,920 mb/sec

A table similar to that of FIG. 6 but with data listed in units of mb/sec might be consulted to determine what compression settings could be used to compress this amount of data given the processor performance data. For convenience, however, the table of FIG. 6 lists data in units of KCycles per macroblock. These units can be thought of as representing the amount of CPU resource available. Using the processor performance data of speed of 2 GHz and the video data acquisition rate of 7920 mb/sec, this value is:

2000 Mhz/(7920 mb/sec)=252 Kcycles per macroblock

That is, there are 252 KCylces of the processor available for compression per macrobclock of data. Note that this calculation assumes the processor is dedicated to only video data compression—it assumes that no other processes are consuming any processor resources. It may be desirable to add some allowance to account for other processes. 80-90% of processor consumption is believed to be reasonable. Using 80% as an example value, the amount of CPU resource available would be estimated as:

(80%)×(2000 Mhz)/(7920 mb/sec)=202 Kcycles per macroblock

The correlation table of FIG. 6 indicates that it takes 212 KCycles/mb of processor resource to perform motion vector analysis compression over an area of 4 pixels when operating with a Pentium 2 GHz processor and that it takes 64 KCycle/mb over a 2 pixel search area. Accordingly, if it is desired to stay below 80% consumption of processor resources, the maximum compression setting that should be used during the communications session is motion vector analysis over a 2 pixel search area. If up to 90% of processor consumption can be tolerated, however, then 90%×252 KCycles/mb=226 KCycles/mb are available, and a compression setting of motion vector analysis over a 4 pixel search area can be set.

Once a suitable compression setting have been identified from the table of FIG. 6 or through experimentation or estimation, they are used during a video data communications session. (block 112) That is, the steps of block 104-110 can be performed at the start of a video communications session such as a videoconference at one or more of the Users A-F (FIG. 1) to identify a suitable compression setting, and the compression during the session then initiated using those settings. The steps may be performed, for instance, by any of the computers 34 when the communications session is first initiated. The steps of blocks 104-110 may likewise be performed during a communications session. In multi-user sessions, for instance, it may be useful to perform the steps of blocks 104-110 anytime a new video stream or user is added to the session.

During the communications session, the method of FIG. 5 includes use of a dynamic portion 102 of the invention to further ensure that the processor is not unreasonably taxed by video data compression demands. A step of monitoring processor utilization is performed. (block 114) As used herein the term "processor utilization" is intended to be broadly interpreted as the amount of processor resources being consumed. Processor utilization may be expressed in terms of a percentage, for instance, where a utilization rate of 80% indicates that the processor is being used 80% of the time. The utilization rate determined through step 114 of the invention determines the overall utilization of the processor, as opposed to the utilization only for video compression. That is, the utilization determined is the total percentage of time that the processor is used by all processes, applications, services and the like currently running. This advantageously takes into account other applications and services that may be running on a machine simultaneously with the video communications session. Other embodiments of the invention, however, may focus only on utilization consumed by the application controlling the video session.

Those knowledgeable in the art will appreciate that there are many suitable steps for determining processor utilization, including use of software function calls to a machines or a processor. One example set of steps includes running a background process that periodically reviews processor utilization and averages this over a series of samples to report a reliable average value. One example step for obtaining instantaneous CPU utilization is by querying a system registry (Operating System) parameter The processor utilization is then compared to a maximum limit. (block 116) The maximum limit may be a pre-set limit that has been set before the session began, or at another time. By way of example, a maximum limit of between about 70%-90% may be set, with a particular example limit being 90%. If this limit is determined to have been exceeded during the communications session, the demands on the processor related to compression are lowered. (block 118)

A reduction in compression demands may be achieved through a number of particular steps. One is to lower the compression settings. The search area may be changed, for instance, from 2 pixels to 1 pixel. Or, motion vector analysis may be suspended and replaced with DCT. An additional or alternative step to that of block 118 can be to reduce the video data acquisition rate. This can be achieved by slowing the scan rate (e.g., change from 30 frames per second to 25), by acquiring smaller images (e.g., image size reduced from 20,000 pixels per image to 18,000 pixels per image), or by reducing the number of streams being communicated (e.g., cease communication of camera #1 in a three camera set-up).

A step of comparing the processor utilization to a minimum limit can also be performed. (block 120) The minimum limit may be preset, and may for example be between 40%-60% with 50% being one example minimum limit. If the processor utilization is below the minimum limit, a step of increasing compression is performed. (block 122) Increasing compression may include, for example, increasing the search area for motion vector analysis from 2 to 4 pixels, increasing compression may include initiating motion vector analysis, increasing image size, increasing scan rate, or adding a stream to the session. If the processor utilization is below the maximum limit and above the minimum limit (i.e., "No" decisions to both of blocks 116 and 120), the method then loops to repeat monitoring of the processor utilization. (block 114) Likewise, if the compression is increased or decreased, the method also loops to repeat monitoring of the processor utilization. (block 114)

In this manner the processor utilization is substantially continuously (e.g., dynamically) monitored. By continuously comparing utilization to a minimum and maximum limit, dynamic control is accomplished through which the data compression may be constantly adjusted to keep it within a pre-set range between the minimum and maximum limits. If desired, the monitoring may be performed on some desired intermittent basis as opposed to substantially constant monitoring, with intervals of 10, 20 or 30 seconds being example periods.

It will be appreciated that although FIG. 5 illustrates a "static" set of steps (block 100) and a "dynamic" set of steps (block 102) of the invention practiced in combination, other embodiments of the invention will utilize only a static portion or only a dynamic portion. For example, a method of the invention may include the steps of block 102 without any of the steps of block 100. In such an embodiment, the initial compression settings may be user specified or arbitrarily set. Likewise, some invention embodiments may include only the steps of block 100 without the steps of the block 102.

Other variations on the method as illustrated in FIG. 5 are contemplated. In the set of steps of block 102, for example, some invention embodiments may not practice the steps of blocks 120 and 122, but instead may only be used to ensure that the compression remains below a processor consumption maximum (i.e., not used to increase compression—eliminate the step of block 122 from FIG. 5). The sequence and other arrangement of many of the steps of FIG. 5 may likewise be changed.

Figure 7:
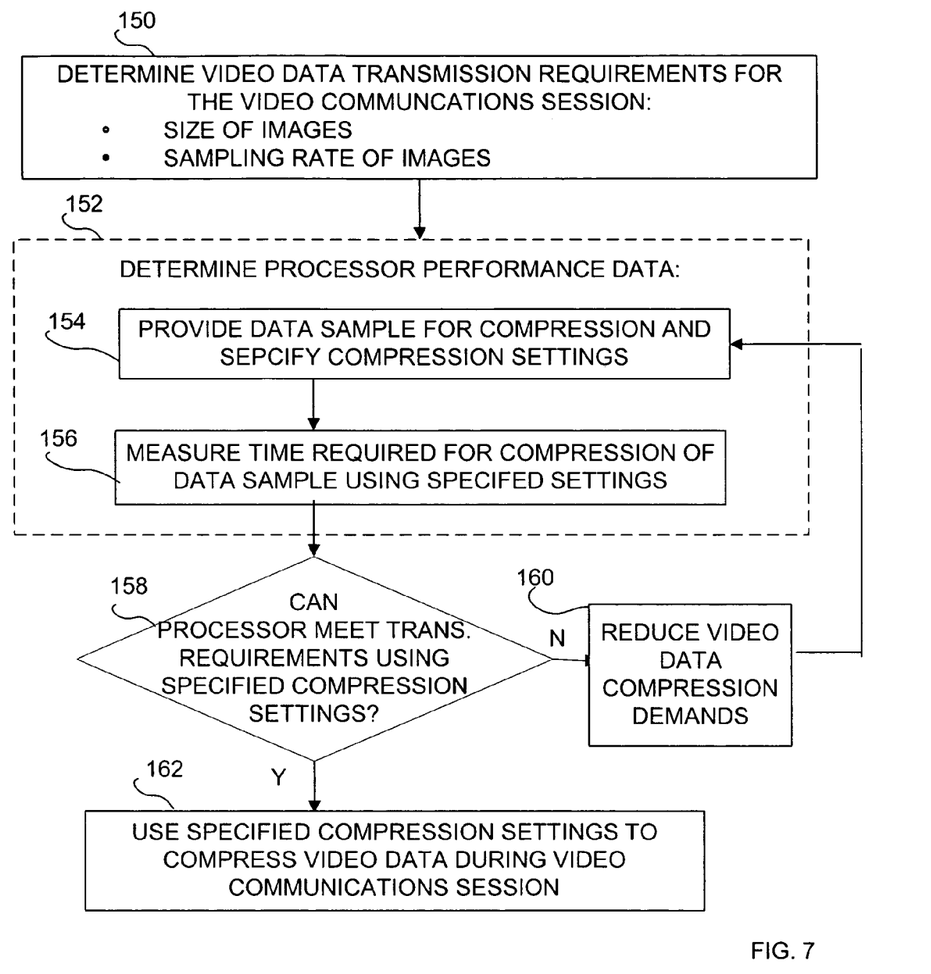
FIG. 7 is a flowchart illustrating an additional example method of the invention.

FIG. 7 illustrates still another example embodiment of the invention. In this embodiment, steps of using predetermined data that related compression settings to processor performance data are replaced with steps of determining the data. This may include, for example, experimentally determining the processor performance data by measuring the time required to compress a know sample size of video data using a particular compression setting. The video data acquisition rate is first determined. (block 150) This step can be generally consistent with that of block 106 of FIG. 5. Generally, the amount of data to be compressed per unit time is determined. The processor performance data is then determined. (block 152) Instead of a step of querying the system for processor speed and family data as was performed in the method of FIG. 5, a step of communicating a test data sample to the processor for compression can be performed. (block 154)

The test data sample may comprise, for example, a set of sample video data of a known size. Compression settings are specified, which may be pre-selected, determined through user input, or may be arbitrarily specified as the maximum compression setting (e.g., motion vector analysis over an 8 pixel search area). The compression settings may specify a search area by number of pixels, may specify motion vector analysis, or may be other settings or parameters. The time required to perform the compression on the sample data using the specified settings is then measured. (block 156) A relatively large sample may be submitted including multiple to increase the reliability of the average time of compression per unit. For example, 10 macroblocks may be submitted and the required compression time divided by 10 to determine an average time per macroblock. These steps may also be repeated as desired to obtain an average of the time required for greater accuracy if desired. Averaging over 2-5 sample compressions, for example, may lead to a more reliable average compression time.

A determination is then made of whether the processor can meet the video data transmission requirements using the specified compression settings. (block 158) If not, the video data compression demands are reduced. (block 160) This may occur, for example, by specifying new compression settings that reduce the video data compression (e.g., specify a smaller search area for motion vector analysis). Alternatively, other parameters can be alternated to lower demands. The video data acquisition rate, for instance, could be lowered by reducing the size of images, the scan rate of images, or the number of data streams. The processor performance data are determined once again using the newly specified settings. (block 150) This is repeated until suitable settings are identified, at which time the communication of video data within a video communications session is initiated using those settings. (block 162)

By way of further illustration of these steps, it may be determined through the step of block 150 that images are being obtained and sent at a rate of 50 per second, and that images have a size of 100,000 pixels. Accordingly, the transmission requirements include that 5 million pixels must be compressed every second. Through the steps of block 152 it may have been determined that the processor required 200 milliseconds to compress 100,000 pixels using a search area of 8 pixels, and that the processor therefore has a compression capacity of 500,000 pixels per second using the specified settings. As a result, the decision of block 158 is negative, and the compression settings are reduced to 6 pixels at block 160. New processor performance data is then determined using these settings. (block 150). This process is repeated until suitable settings (settings that result in processing capabilities of at least 5 million pixels per second) are identified.

Those skilled in the art will appreciate that the example embodiments described and discussed herein have been selected as representative of methods, systems and program products of the invention only, and that the invention is not limited to these examples. For example, although example invention embodiments have been illustrated in association with real time streaming data applications such as video conferences, other applications will find benefits and advantages for practice of the invention. Other examples include person to person videophone calls and the communication of one way streaming videos data.

Also, it will be appreciated that although example method and program products have been illustrated in a particular sequence of steps, the sequence is not necessary to the invention and could easily be altered. Some steps may be eliminated. Referring to FIG. 5, for example, only the steps of the static portion 100 or the dynamic portion 102 may each be considered embodiments of the invention. Computer program embodiments of the invention are also not limited to a single computer, but may be practiced by a plurality of computers. As an example, a server computer 12 and a User A-F computer of the network of FIG. 1 may each be running program code that includes aspects of the present invention, and each separate computer may carry out some steps of a method of the invention.

The invention claimed is:

1. A videoconference computer program product, comprising computer readable program instructions that are stored in a non-transitory computer readable medium, the program product for use with a videoconference system having at least one processor for compressing video data, the program instructions when executed by one or more computers cause the one or more computers to carry out steps of:
   determining processor performance data for the at least one processor;
   determining a video data acquisition rate;
   using said processor performance data and said video data acquisition rate to identify a video data compression setting to use during the communications session;
   wherein the step of using said processor performance data and said video data acquisition rate comprises referring to data stored on a non-transitory computer readable medium that relates processor performance to a corresponding data compression setting for a plurality of different processors and a plurality of different compression settings;
   wherein said stored data is in units of one or more of a time required to perform a motion vector search for a given search area using a given processor family and speed, and processor resources required to compress a specified size of data.

2. The computer program product as defined by claim 1 wherein said processor performance data includes at least one of the family of each of the at least one processor, the speed of each of the at least one processor, and the number of the at least one processor.

3. The computer program product as defined by claim 1 wherein the step of determining said processor performance data is performed using a function call.

4. The computer program product as defined by claim 1 wherein the step of determining said video data acquisition rate includes determining the amount of video data to be compressed per unit time during the communications session.

5. The computer program product as defined by claim 1 wherein the step of determining said video data acquisition rate includes determining at least the image scan rate, the number of video streams to be communicated during the communications session, and the size of video images to be communicated during the communications session.

6. The computer program product as defined by claim 1 wherein said data compression settings specify the type of compression to use.

7. The computer program product as defined by claim 1 wherein said data compression settings define a motion vector analysis search area.

8. The computer program product as defined by claim 1 wherein the method is performed when a new user joins the communications session already in session.

9. The computer program product as defined by claim 1 and further including the step of experimentally determining data that relates one or more compression settings to one or more processors.

10. The computer program product as defined by claim 9 wherein the step of experimentally determining said data includes recording in a non-transitory computer readable medium the time required to compress video data of known size using a plurality of different compression settings and a plurality of different processors.

11. The computer program product as defined by claim 1 wherein the step of determining processor performance data for the at least one processor comprises measuring the time required for said at least one processor to compress a sample set of data using an initial compression setting, and storing the results of said measuring in a non-transitory computer readable medium for later use in determining a subsequent compression setting.

12. The computer program product as defined by claim 11 and further including the steps of reducing video data compression demands if said processor performance data is not sufficient to compress said sample set of data in a time required to meet said video data acquisition rate.

13. The computer program product as defined by claim 1 and further including the steps of:
    monitoring the utilization of the at least one processor during the data communications session;
    and, reducing video data compression demands on the at least one processor if said utilization exceeds a limit.

14. The computer program product as defined by claim 13 and further including the step of increasing said video data compression demands on said at least one processor if said utilization falls below a second limit.

15. The computer program product as defined by claim 13 wherein the step of reducing said video data compression demands comprises changing said video data compression settings.

16. The computer program product as defined by claim 13 wherein the step of reducing said video data compression demands comprises reducing one or more of a video data scan rate, size of video images, and a number of video data streams.

17. A computer program product for compressing streaming video data communicated during a video data communications session between at least three users, the program product including computer readable program instructions that when executed by a computer having at least one processor at each of the at least three users to carry out the steps of:
    determine the processor family and speed of each of the at least one processor on the computer;
    determine the video data acquisition rate expected during the communications session using at least the size of images to be communicated during the session and the scan rate to be used during the session;
    use correlation data stored in a non-transitory computer readable medium to select a compression setting to use to compress video data during the communications session, said correlation data relating a plurality of processors to a plurality of compression settings;
    use said compression setting to specify the amount of compression of the video data being communicated from the computer during the video data communications session;
    monitor processor utilization during the video data communications session;
    and, change said compression setting if said processor utilization reaches a predetermined limit,
    wherein the step of determining the processor family and speed and for determining the video data acquisition rate, comprises referring to data stored on a non-transitory computer readable medium that relates the processor family and speed to a corresponding video data acquisition rate setting for a plurality of different processors and a plurality of different compression settings;
    wherein said stored data is in units of one or more of a time required to perform a motion vector search for a given search area using a given processor family and speed, and processor resources required to compress a specified size of data.

18. A videoconference system for communicating streaming video data over a data network between at least two users comprising:
    at least one camera and at least one microphone connected to at least one computer at each of the at least two users, each of said at least one computer connected to the data network and having at least one processor;
    and, each of said at least one computers performing video data compression through the steps of:
    determining processor performance data for said at least one processor on said at least one computer by determining at least the family of said at least one processor;
    determining a video data acquisition rate;
    using said processor performance data and said video data acquisition rate to select a data compression setting for the data communications session by referring to stored correlation data that relates processor performance to data compression settings for a plurality of processors and compression settings;
    and, monitoring processor utilization during a video data communications session and reducing video data compression demands if said processor utilization exceeds a limit;
    wherein the step of using said processor performance data and said video data acquisition rate comprises referring to data stored on a non-transitory computer readable medium that relates processor performance to a corresponding data compression setting for a plurality of different processors and a plurality of different compression settings;
    wherein said stored data is in units of one or more of a time required to perform a motion vector search for a given search area using a given processor family and speed, and processor resources required to compress a specified size of data.

* * * * *